US006654147B1

United States Patent
Ramot (10) Patent No.: US 6,654,147 B1
(45) Date of Patent: Nov. 25, 2003

(54) ANTI-ALIASING FOR DIGITAL PRINTING

(75) Inventor: Ran Lasco Ramot, Tel-Aviv (IL)

(73) Assignee: Creo IL Ltd., Herzlia (IL)

( * ) Notice: Subject to any disclaimer, the term of this patent is extended or adjusted under 35 U.S.C. 154(b) by 0 days.

(21) Appl. No.: 09/348,053

(22) Filed: Jul. 6, 1999

Related U.S. Application Data (60) Provisional application No. 60/091,861, filed on Jul. 6, 1998.

(51) Int. Cl.[7] .................................................. G06T 5/00
(52) U.S. Cl. ....................................... 358/3.1; 358/3.2
(58) Field of Search ....................... 358/3.1, 1.9, 3.11, 358/3.12, 3.2; 382/266–269

(56) References Cited

U.S. PATENT DOCUMENTS

| | | | | |
|---|---|---|---|---|
| 5,479,175 A | | 12/1995 | Cianciosi et al. ............ | 347/252 |
| 5,581,292 A | | 12/1996 | Cianciosi et al. ............ | 347/131 |
| 5,793,936 A | | 8/1998 | Deffner et al. .............. | 395/109 |
| 5,841,956 A | | 11/1998 | Venkateswar et al. ...... | 395/109 |
| 5,862,257 A | * | 1/1999 | Sekine et al. ................ | 382/199 |
| 5,949,428 A | | 9/1999 | Toelle et al. ................. | 345/431 |

FOREIGN PATENT DOCUMENTS

| JP | 10334228 A | * | 12/1998 | ............. G06T/3/40 |
|---|---|---|---|---|

* cited by examiner

*Primary Examiner*—Thomas D. Lee
*Assistant Examiner*—Stephen Brinich
(74) *Attorney, Agent, or Firm*—Eitan, Pearl, Latzer & Cohen Zedek, LLP (57) ABSTRACT

The present invention presents method and apparatus for anti-aliasing elements in pages containing variable information, to be printed by a digital printer. Each page element is pre-rasterized to a resolution higher by a given factor than the output resolution, and the pixels that belong to non-printable areas are denoted 'Background'. During the anti-aliasing (averaging) process, each new pixel gets an attribute value, dependent on the higher resolution pixels that contributed to the new pixel:

Background—if all contributing pixels were denoted 'Background'.

Opaque—if all contributing pixels were denote 'Non-Background'.

Semi-Background—if the contributing pixels were partly 'Background' and partly 'Non-Backgroun'.

One or two intermediate frame buffers serve to assemble sequentially, for each element, the pixel's value, when it is defined as 'Opaque', and the calculated new value, when it is defines as 'Semi-Background'. A merging mechanism computes the final output value of each pixel using the values and attributes assigned to it.

15 Claims, 6 Drawing Sheets

ANTI-ALIASING FOR DIGITAL PRINTING

CROSS REFERENCE TO RELATED APPLICATIONS

This application claims the benefit of U.S. provisional application Ser. No. 60/091,861 filed Jul. 6, 1998.

FIELD OF THE INVENTION

The present invention relates to the field of digital printing and particularly to the performance of anti-aliasing for quality enhancement of the printed picture in the application of variable printing.

BACKGROUND OF THE INVENTION

In the scope of the present invention, anti-aliasing (AA) is a method for solving quality problems resulting from printing graphic elements in relatively low resolutions. Printing resolutions that are low enough to benefit from this enhancement are in the range of 240–600 DPI.

Printing systems relevant for the suggested enhancement are those with color depth per pixel greater than 2 levels per color plane. For example, suppose a printing machine uses 4 color planes—cyan, magenta, yellow & black (CMYK). If for each pixel, any of C, M, Y & K components can only be printed as either 0% color or 100% color, then this machine is not relevant for the anti-aliasing method suggested in the present invention. If, however, any of the color components can have more than 2 values (for example 16 or 256 different values), then anti-aliasing as suggested can be applied.

In general, anti-aliasing is a process aimed at overcoming the resolution limitation imposed by the printing machine, by getting more spatial graphic information than what is allowed by the printing resolution. The excess spatial information is then transformed into the color space, in a way that fools the eye to perceive more details. A simpler definition of anti-aliasing is reducing the undesirable stair-step pattern along the edges of images printed on low-resolution printing device. Typically, anti-aliasing involves reducing the intensity of intermediate pixels, to give the appearance of a smooth line or edge.

Figure 1:
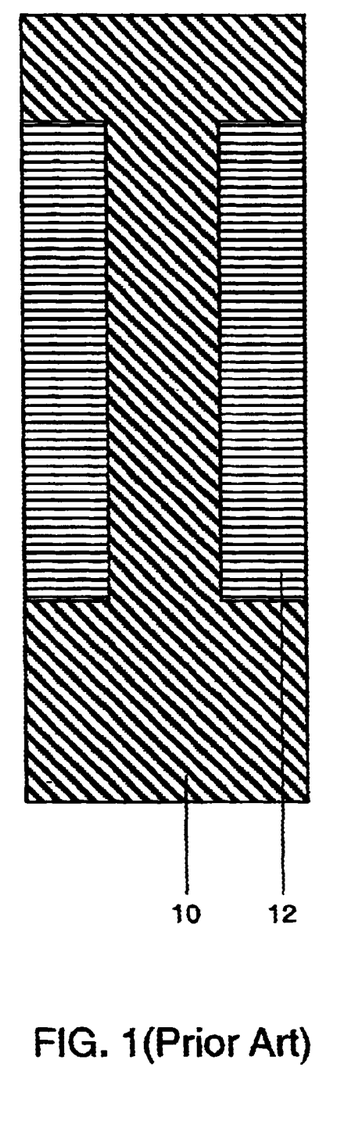
FIG. 1 is an example of an upper case letter 'I', printed with tint color (100%) surrounded by gray background of 20%, without anti-aliasing.
Figure 2:
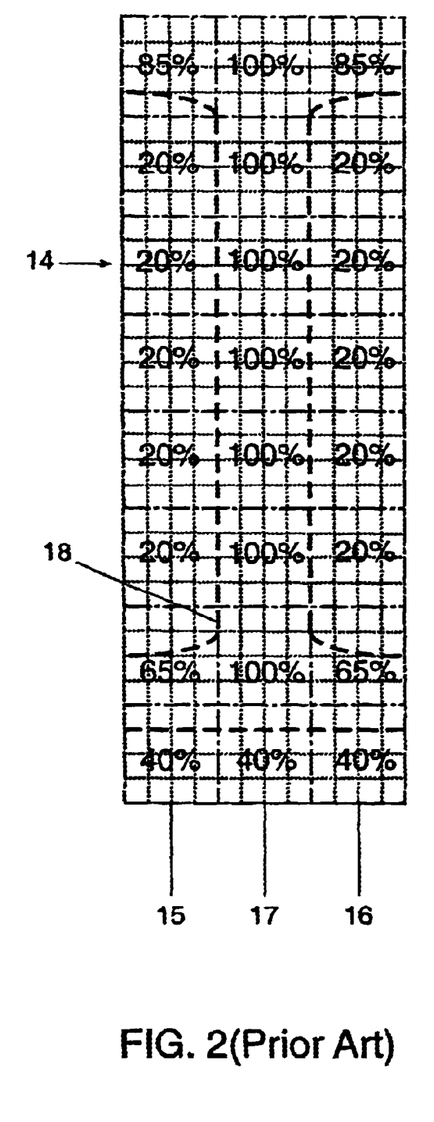
FIG. 2 shows the same example as FIG. 1, anti-aliased with the assumption of a 20% background value.

A better understanding of the anti-aliasing process may be attained by the following detailed description and examples in FIGS. 1 and 2:

When rasterizing graphic data for the purpose of printing, the rasterization is done to a resolution that is higher than the printing resolution, for example, 4 times higher at each direction x & y). That is, if printing is done at 300 psi, rasterization will be done to 1200 dpi. Each printed pixel will thus be represented by a matrix of 4×4 pixels in the image raster (e.g. matrix 14 in FIG. 2).

Following that, a pass is made over the entire detailed raster data (1200 dpi). Each 4×4 matrix is averaged to a single color value. The averaging may be a simple sum of all 16 values divided by 16, or any other, more sophisticated known filter. Today, the simple approach is mostly used. The exact averaging algorithm used does not have much influence on the implementation of the present invention.

When the element is not monochromatic, but has several color components (like RGB or CMYK) the process takes place for each color component in the picture (Cyan, Magenta etc.), independently. The present invention will be described only in reference to the monochromatic printing. However, anything said could easily be expanded to the polychromatic case, where each pixel is defined by several color components like: RGB, CMYK, etc.

FIG. 1 is an example of an upper case letter 'I' 10, printed with tint color (100%) surrounded by gray background of 20% 12. No anti-aliasing has been performed.

FIG. 2 shows the same example, but here, anti-aliasing has been performed, creating gray levels that have not existed in the original image. For example, the value of 10% tint in the lower right pixel 16 has been derived by averaging the $4/16$ pixels having 100% tint with the $12/16$ pixels having 20% tint. Thus: $100*4/16+20*3/4=40$. As a result, the letter 'I' in FIG. 2 will have a smoother perceived outline 18.

The process of preparing a page for printing is the pre-press process that includes, amongst others, the RIP (Raster Image Processing) stage that creates a raster representation of the page. The raster representation is the definition of the color of each pixel in the printing resolution.

In the process of RIPping, a hardware or software module called 'RIP' gets a non-raster representation of the complete page. A page description file containing such a representation is created by an application that assembles a page from its components: text, graphics and scanned images. Such an application could be QuarkXpress, available from Quark, Inc. of Denver, Colo. for example. The page description file describes a page in a Page description Language (PDL) such as PostScript, available from Adobe Systems Inc. of San Jose, Calif. The raster generated by the RIP can be stored in any raster format file, such as Scitex CT & I.W, as used by Scitex Corporation of Herzlia, Israel. Alternately, it can be held in memory buffers from which it is printed without being stored on disk.

It is important to not that time needed for RIPping a complex page will usually be much longer than the time it takes to print a single copy of the same page by the printing machine. In the case of conventional (non-variable) printing, this is not significant, since a single (lengthy) RIP operation will yield the printing of many (hundreds, thousands, or more) copies of the page.

With the rising of digital technology, where pages are printed directly from a computer data stream, without involving a pre-set medium such as film or plate, the printing device has no overhead in having each printed page different from its predecessor. This provides the opportunity for variable printing. The ultimate implementation of this technology enables the printing of a unique copy for each recipient of the printed material, tailored according to his/her measurements.

For example: A motor company, that manufactures dozens of models, wants to send advertising brochures in direct mail. Instead of sending a comprehensive and expensive brochure containing a lot of irrelevant information to a certain recipient (like too expensive car, station wagon to a bachelor, etc.), a unique brochure will be assembled for each recipient. For this, available personal information can be used, like place of residence, sex, education level, economic status, marital status and even hobbies and more. Part of this information can be attained from various database owners.

Thus, a brochure will be assembled for each recipient, containing only relevant information, as well as additional specific information like a map illustrating the location of the dealers nearest to the recipient. In order to increase the impact, some text may be addressed to the recipient by name.

It is evident that in a case like the one described, where an advertiser in the USA might wish to print several millions of copies, the model introduced above for RIPping may be very problematic. RIPping each of those pages separately can take an unreasonable amount of time, even using a very fast computer. For this purpose, an enhanced model was developed to enable the processing of pages to keep pace with the speed of the digital-printing machine.

This model assumes that even though each page is unique, it may contain graphic elements that are used by other pages.

In the example of the car brochures, many recipients, though not all, will get the picture of a specific car, along with the text accompanying it. All recipients from a certain area will get the same map for the dealers, etc.

The collection of all instances of a document to be printed (brochure in the above example) is called a Printing Job, and is described by a Job Description file that comprises information about all the pages and all the graphical elements participating in all the instances.

Figure 3:
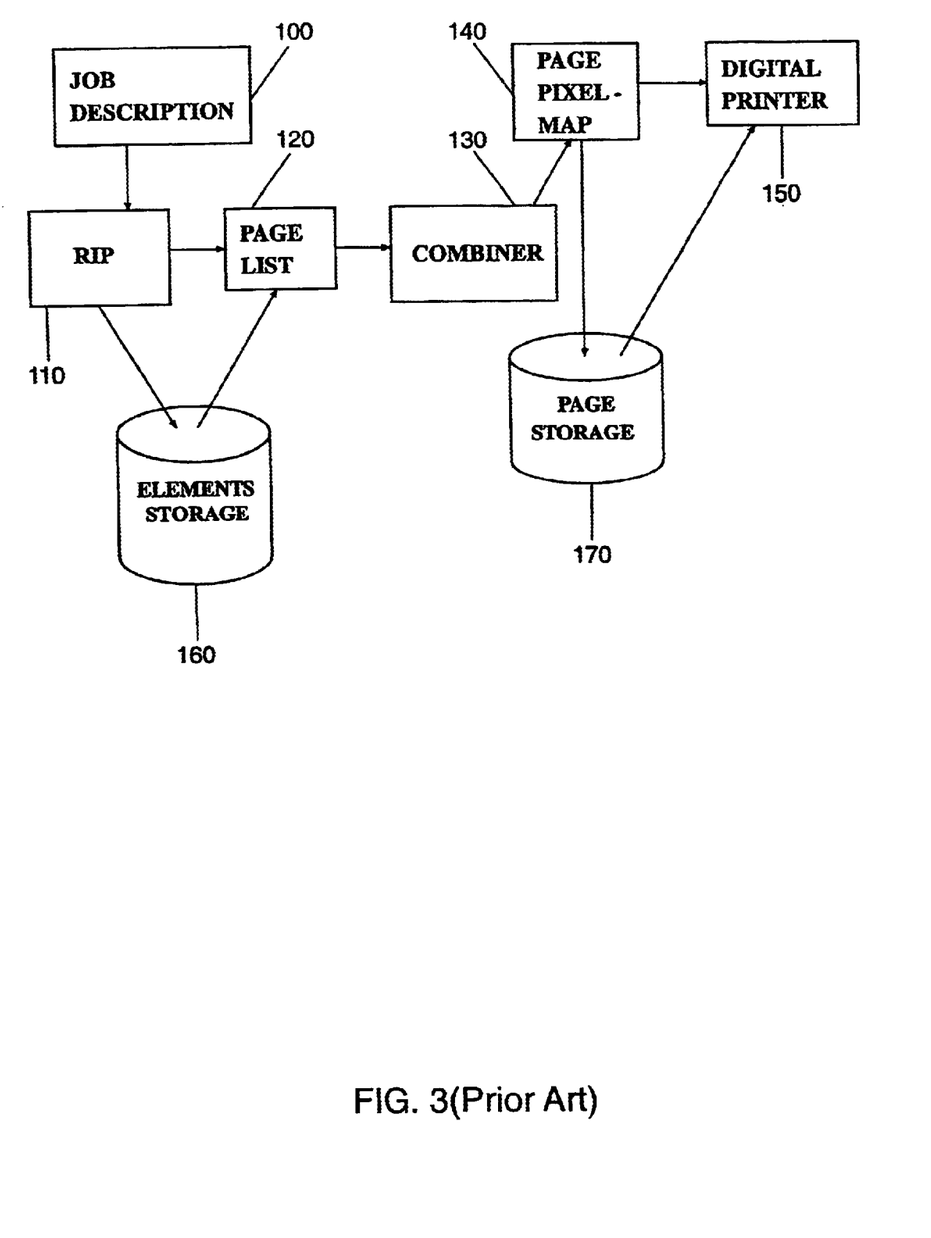
FIG. 3 is a schematic description of a prior-art system, designed to perform an efficient processing of pages for digital printing.

FIG. 3 describes schematically a prior-art system designed to perform a more efficient processing of pages for digital printing.

First, Job description file 100 is fed into RIP 110. RIP 110 identifies all the elements participating in all the pages contained in the Job. Each element is RIPped separately and its raster representation stored on disk 160 or, in rare cases, in memory. Scitex CT & LW raster formats are suitable for such storage. In addition, for each page to be printed, a 'Page List' 120 is assembled, containing indication of all the elements composing this page and the exact position of each element on the page. The elements on the Page List are organized by order of appearance—if two elements intersect, the latter will cover the former on the printed page.

During printing, the Page List 120 is processed by hardware or software module 130 called 'Combiner'. The Combiner 130 reads all the raster elements participating in a page from disk 160 (or memory) and combines them into page pixel-map 140, according to the Page List directives, to be stored in a rasterized pages storage 170 or to be printed by a digital printing machine 150. The Combiner 130 has relatively little manipulation to do over the graphic data, since the data has already been rasterized to printing resolution. An example of a Combiner is PrintStreamer II, provided by BARCO Graphics NV of Gent, Belgium. Following is a general description of a Combiner's 130 mode of operation:

Assume that we have a frame buffer large enough to contain the raster representation of an entire page. The list of participating elements is read sequentially by the Combiner 130 and each element is copied, in its turn, to the buffer, as follows. The offset of the first row is calculated, using the element position on the page. Then, each row of the element is copied into the buffer (number of pixels being the width of the element) and the offset of the next row is calculated by adding the buffer width to the offset of the current row.

A raster element page (text passage, graphic segment or scanned image), designated to be combined into a printed page, is defined in a rectangular domain, which is the enclosing rectangle to all graphics in the element. However, the elements' graphics does not necessarily cover the entire rectangular area. The rectangular domain may contain areas in which no graphics were 'painted' at all. If such an element is positioned over another graphic element, the graphics of the lower element should show through the 'unpainted' areas of the upper element.

For example, if the element is a text passage written in black, it may be positioned on the final page in various combinations; it may be placed over a pink-tinted area or over a scanned photograph, etc. In any such case, it should be assured that in the spaces between letters, as well as in the unpainted portions of the letters themselves, the graphic information below the text would show. This graphic information may, naturally, be different for every instance in which this text is placed on a page.

For this reason, the format containing the variable raster element should have a clear definition of the areas in which, during combining, the 'lower' graphic data should be unaltered. These areas are referred to as the 'background' areas of the raster element. In the cases in which the raster element is held as a Scitex LW file, these areas can be defined by a special color index.

The RIP can recognize background areas as areas to which there was no graphic reference in the input file (PostScript, for example) and, if it creates a Scitex LW, it can paint these areas with a color that has a pre defined index designated for this purpose.

Returning to the Combiner 130, its mode of operation may be enhanced, so that it may handle properly background pixels.

When the Combiner combines a raster element, whenever it encounters a background pixel, it will not copy it to the frame buffer, but skip to the next pixel, both in the element and the frame buffer. Thus, the pixel color in that location in the frame buffer will be unchanged, still holding the color of the element below.

The problem, to which the present invention is directed, arises if anti-aliasing is attempted at the stage of rasterizing a variable element. From the previous explanation it can easily be understood that anti-aliasing requires, relatively, a lot of computing resources. This is the reason that motivates the performance of anti-aliasing at the stage of the RIP 110 (once per element) and not at the stage of the Combiner 130 (once per printed instance of an element).

In other words, in order to save time at the combine stage, we would like to RIP each element to a resolution 4 times higher (for example) and then immediately perform anti-aliasing to get a raster in the final printing resolution.

The problem arises from the fact that some areas in the element are background areas. Suppose we look at a 4×4 matrix that will be reduced to a single pixel by anti-aliasing.

Analyzing this matrix yields one of three possible outcomes for each print-resolution pixel to be created:

a) Opaque—The area of the matrix is entirely painted. In this case there is no problem; averaging should be done according to the above explanation. The resulting averaged pixel is Opaque.

b) Background—The area covered by the matrix is entirely background area. Here again there is no problem. The averaged pixel resulting from this matrix should also be considered background area. When combining, a pixel from a lower element may show, and we can assume that it had been properly anti-aliased.

c) Semi-Background—The area covered by the matrix is partly painted and partly background. This is the problematic case. We would have liked to use all the color values in that area to make the averaging. However, at this stage, only part of the data is available, that is, the color of the painted area. The color in the background area will only be known at the combining stage, when we can read the color of the element underneath. Furthermore, the color underneath may be different each time the same element is combined (if it is put on top of different elements) and therefore, the resulting averaged color of the pixel could be different every time it is combined.

A method for solving the anti-aliasing problem for display purposes is disclosed in the article "Anti-aliasing and Transparency" by Chris Lilley (incorporated herein as reference), as one of a series of article under the title: "Not Just Decoration: Quality Graphics for the Web" (http://www.w3.org/Conference/WWW1/Pagers/53/gq-bostom.html). The article uses a similar idea of defining three levels of transparency for each pixel.

SUMMARY OF THE INVENTION

The present invention relates to the field of digital printing, and particularly to the performance of anti-aliasing for quality enhancement of the printed picture in the application of variable printing.

In one aspect of the present invention there is suggested a method for building a raster representation of an anti-aliased color or monochromatic page for digital printing, the page comprising a plurality of elements, the method comprising the steps of:

Rasterizing each of the plurality of elements to a format comprising, for each pixel of the element: color value and binary background attribute.

Anti-aliasing each of the rasterized elements to produce pixels with background factors, each background factor having a value of Opaque, Background or one of a series of Semi-Background values;

Saving the background factors as part of the element's data file or as a separate data structure.

Composing the page, or sequentially composing portions of the page, by placing the anti-aliased elements into a page pixel map sequentially, where the value of each page pixel in the page pixel map is calculated based on:

the value of the corresponding element's pixel, the background factor of the corresponding element's pixel and the previous value of the page pixel.

In another aspect of the present invention, there is provided an apparatus for building a raster representation of an anti-aliased color or monochromatic page for digital printing, the page comprising a plurality of elements, the apparatus comprising:

Storage means for storing rasterized page elements and a background factor for each pixel of each of the elements, the background factor having one of the values: Opaque, Background or one of a series of Semi-Background values.

Electronic means, coupled to the storage means, for reading the rasterized page elements and the background factors into memory.

A frame buffer, coupled to the electronic means, for holding pixel values, background factors and original pixel values for an entire page or a portion thereof.

Processing means coupled to the frame buffer, operable to:

Clear the frame buffer.

Sequentially render each of the plurality of element into the frame buffer, the rendering comprising the steps of:

Skipping pixels for which the background factor has the value Background.

Writing both pixel value and background factor to the frame buffer, when the background factor has a Semi-Background value.

Writing original pixel value and clearing the background factor and the pixel value in the frame buffer, when the background factor has the value Opaque.

Merging means such as a look-up table, coupled to the frame buffer, operable to receive original pixel value, background factor and pixel value from the frame buffer and merge them to a single pixel value.

Output means coupled to the merging means, operable to deliver the merged pixel values from the merging means to a memory storage or disk storage, or directly to a digital printing engine.

In another aspect of the present invention, there is provided an apparatus for building a raster representation of an anti-aliased color or monochromatic page for digital printing, the page comprising a plurality of elements, the apparatus comprising:

Storage means for storing rasterized page elements and a background factor for each pixel of each of the elements, the background factor having one of the values: Opaque, Background or one of a series of Semi-Background values.

Electronic means, coupled to the storage means, for reading the rasterized page elements and the background factors into memory.

A first frame buffer, coupled to the electronic means, for holding original pixel values for an entire page or a portion thereof.

A second frame buffer, coupled to the electronic means, for holding background factors and pixel values of pixels for an entire page or a portion thereof.

Processing means coupled to the first and second frame buffers, operable to:

Clear both frame buffers;

Sequentially render each of the plurality of element into both frame buffers, the rending comprising:

Skipping, in both frame buffers, pixels for which the background factor has the value Background.

Writing both pixel value and background factor into the second frame buffer when the background factor has a Semi-Background value.

Writing original pixel value into the first frame buffer and clearing the pixel location in the second frame buffer, when the background factor has the value Opaque.

Merging means such as a look-up table, coupled to both frame buffers, operable to receive original pixel values from the first frame buffer and background factors and pixel values from the second frame buffer, and merge them to a single pixel value.

Output means coupled to the merging means, operable to deliver the merged pixel values from the merging means to a memory storage or disk storage, or directly to a digital printing engine.

DETAILED DESCRIPTION OF THE INVENTION

The problem arising when trying to perform anti-aliasing on variable elements can be explained by demonstrating what happens if it is ignored. Suppose, that whenever a background area is encountered while anti-aliasing a variable element, we assume that it is white (color value of 0%).

Figure 4:
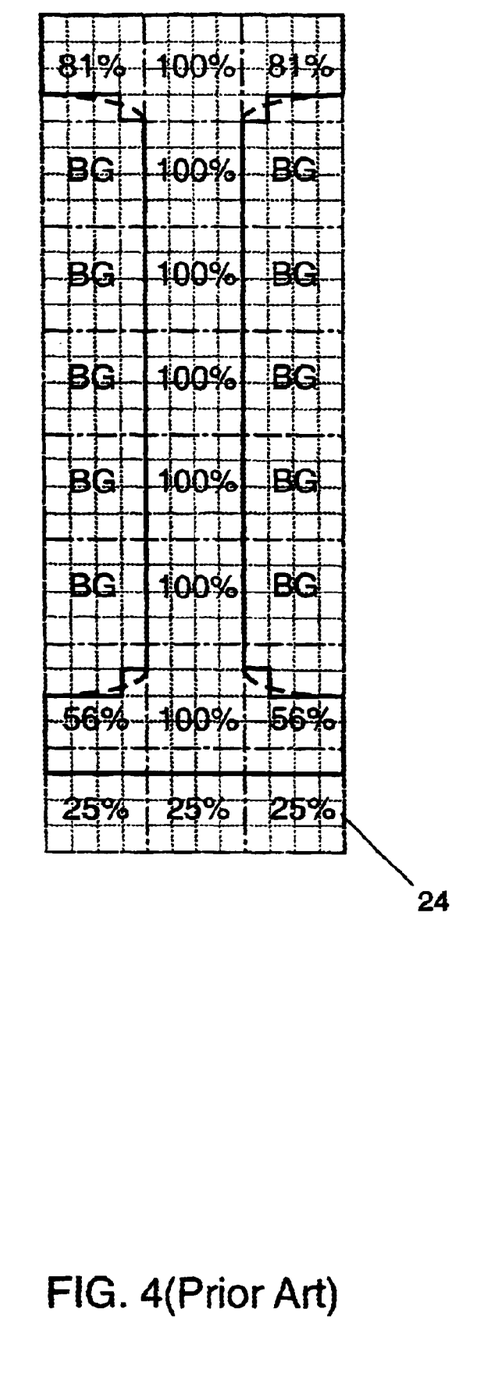
FIG. 4 shows the same example as FIG. 1, anti-aliased with the assumption of a 0% background value.

FIG. 4 shows the letter 'I', colored 100%, put on the same grid as in FIG. 2. The color values specified are according to the assumption that the background is white (0%). If this element is indeed placed over a white background then, of course, this result is correct. If, however, we place it over a 20% background, as is the case in FIG. 2, then we can see (by comparison to FIG. 2) that the results are wrong for all the pixels for which there was averaging of two color areas. All the pixels marked 'DO', however, will get the right background color at the time of combine.

But even worse, consider the case of FIG. 4, where this same element is placed over a 55% background. Two very disturbing effects will appear at the bottom of the letter. First, the two pixels with 56% color will blend with the background and thus the two bottom serifs of the letter will disappear. Second, the three pixels with 25% color, at the bottom, will be brighter than both the letter and the background. This will create a sort of visible white line that has no justification.

The simplest, most straight forward solution to this problem would be to keep all the variable elements' rasters in the resolution which is needed for the anti-aliasing process (4 times the printing resolution, for example) but not perform anti-aliasing yet. The combining process (of a specific page, before printing it) will be done in this high resolution, and only then will anti-aliasing be performed on the assembled page. Since after combining there are no background areas any more, but rather each pixel has its final color, the result will be accurate.

This solution is very costly in performance. It enforces the Combiner 130 of FIG. 3 to work with 16 times more pixels (in this example), and also to perform anti aliasing for the entire data of each printed page.

The present invention proposes a method for performing anti-aliasing at the preparation stage, after RIPping, and for generating and storing final resolution rasters for the Combiner. However, additional information will be saved, which will enable the Combiner to generate as truly as possible the color values of those pixels that were originally partly background area.

For this purpose, each variable raster element is accompanied by an additional data structure, called anti alias layer (or AA layer), which may be a separate file, or record, or part of the variable element file or record. The AA layer describes a collection of pixels in the final printing resolution. These pixels are the ones that were recognized by the anti-aliasing process as pixels (matrices) that cover both background area and painted area (Semi-Background pixels). For each such pixel, two attributes are saved in the AA layer:

a) The color value that was painted into the variable element at that location.

b) The 'background portion'. A value between 0 and 1 specifying the relative portion of background area covered by this pixel, '1' being background only and '0' is no background at all (The values '1' and '0' will not appear, since they represent pixels that do not belong to the AA layer).

Each of these attributes requires maximum storage space of one byte.

For example, consider the letter 'I' in FIG. 4;

For the upper right pixel 22, the attributes will be:

a) 100%; b) 0.19

For the lower right pixel 24, the attributes will be:

a) 100%; b) 0.75

Since the amount of pixels in the AA layer is small, relative to the amount of pixels in the variable raster element, it is possible to get a compact representation of these pixels. For example, we can use run-length encoding where each run counts the number of pixels not participating in the AA layer. In this case we can use 32 bit words, where each word is constructed as follows:

Distance (in pixels) from last AA pixel or beginning of row—16 bits;

Color value (255=100%, 0=0%)–8 bits;

Background portion (255=1, 0=0)–8 bits;

We can specify that a 32-bit word holding the value 0 marks the start of a new row.

For each pixel described in the AA layer, the corresponding pixel in the elements' raster (LW for example) is marked as background. This is important, because when the raster element is placed by the Combiner, we do not want the existing color value to change at that location. In the next step, this color value will be used, along with the information in the AA layer, to calculate a new color for that pixel.

It is now possible to extend the above model of a simple Combiner, so that it involves the AA layer in its processing. We will assume the same frame buffer model. Each variable element is put in the frame buffer in two stages:

a) The elements' raster is copied to the frame buffer without changing the background areas, namely, only non-background pixels are copied. This is the same process as described in conjunction with the prior art.

b) For each pixel in the AA layer, we first read the corresponding pixel from the frame buffer. Its value is called 'BG color'. We calculate the new pixel value 'V' by :

$$V=(`BG\ color` * `background\ portion`)+`color\ value` * (1-`background\ portion`)$$

The values 'background portion' and 'color value' are the attributes described above, that are attached to the AA layer pixel. This calculation can be made efficiently by the use of a 3D-lookup table ( ), where the three entries are: BG color, background portion and color value. The output of the table will be the requested value 'V'.

For example, consider the example in FIG. 2: the letter 'I' colored 100% put on a 20% background. In this case, before placing the letter, the frame buffer is filled with 20% pixels. Consider each of the three bottom pixels 15, 16 and 17 that have 0.75 background portion. The calculation of the new value is.

$$V=20\% * 0.75+100\% * (1-0.75)=40\%$$

This method will be referred to as the "Accurate" method, since it uses data from all the pixels overlapping a certain pixel location to calculate the final value for that pixel.

The above, simplified description of a Combiner is not suitable for fast hardware implementation, as far as the manipulation of the AA layer is concerned. Fast hardware manipulates data in bursts. Data can be read, modified and written in bursts. In the "Accurate" method previously explained, the manipulation of each pixel in the AA layer requires reading a pixel from the frame buffer, modifying it (as explained) and rewriting it before the next pixel is considered. This is called 'read-modify-write' and is not suitable for fast (and cheap) hardware implementation.

Figure 5:
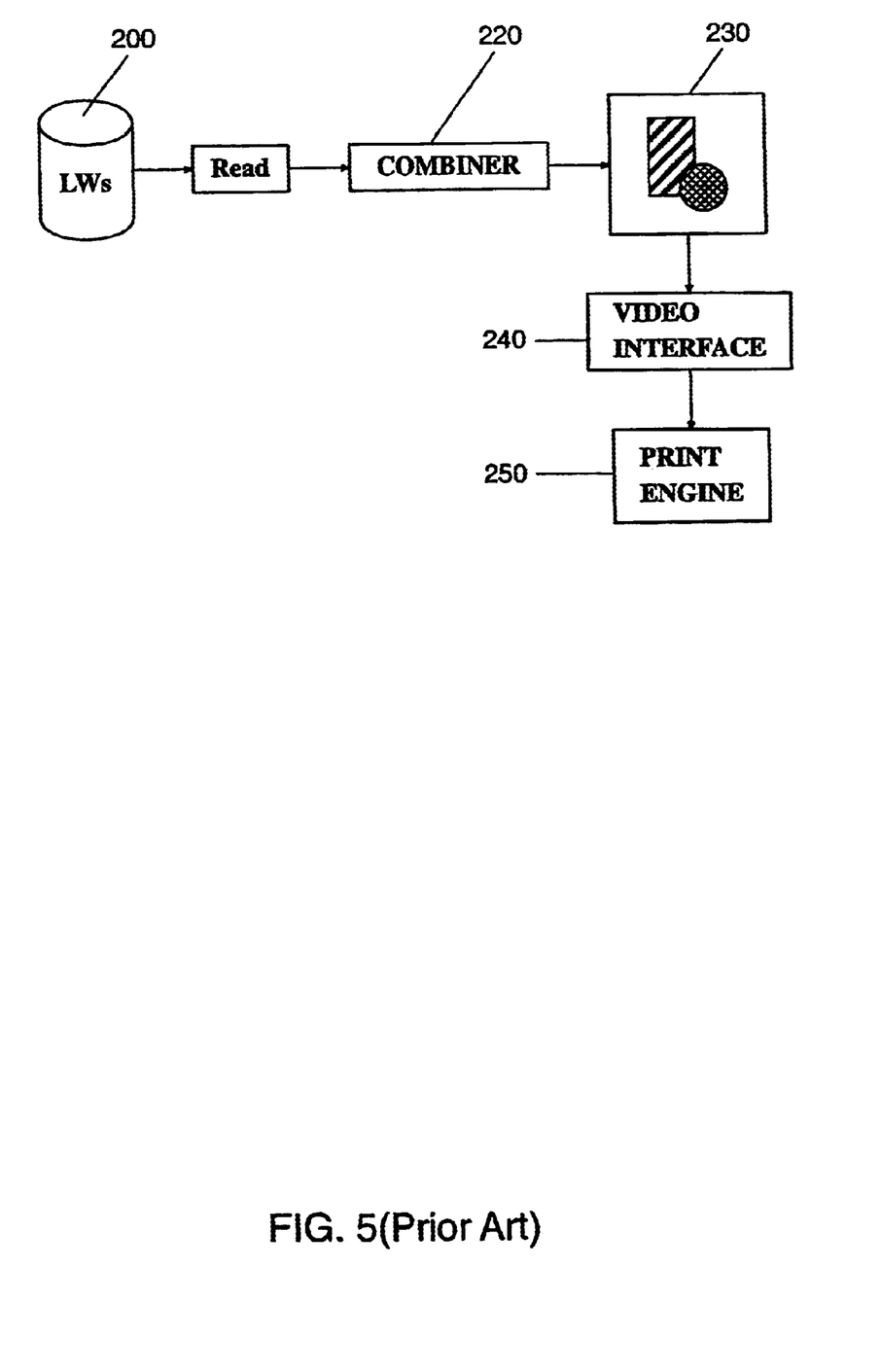
FIG. 5 is a schematic description of a simple prior-art hardware system with a Combiner that does not handle the AA layer.

FIG. 5 is a schematic description of a simple prior-art hardware system with a Combiner 220 that does not handle the AA layer. The Combiner 220 receives variable elements (LWs in this example) from storage 200, and writes each element to frame buffer 230. When the frame buffer 230 contains an entire page's representation, or a complete band (portion) of a page, the frame buffer 230 is read by the 'video interface' 240 and the page data is fed to the print engine 250 in the speed of the printer (usually double-buffering is used, to generate one page, or band, while another is being printed).

Figure 6:
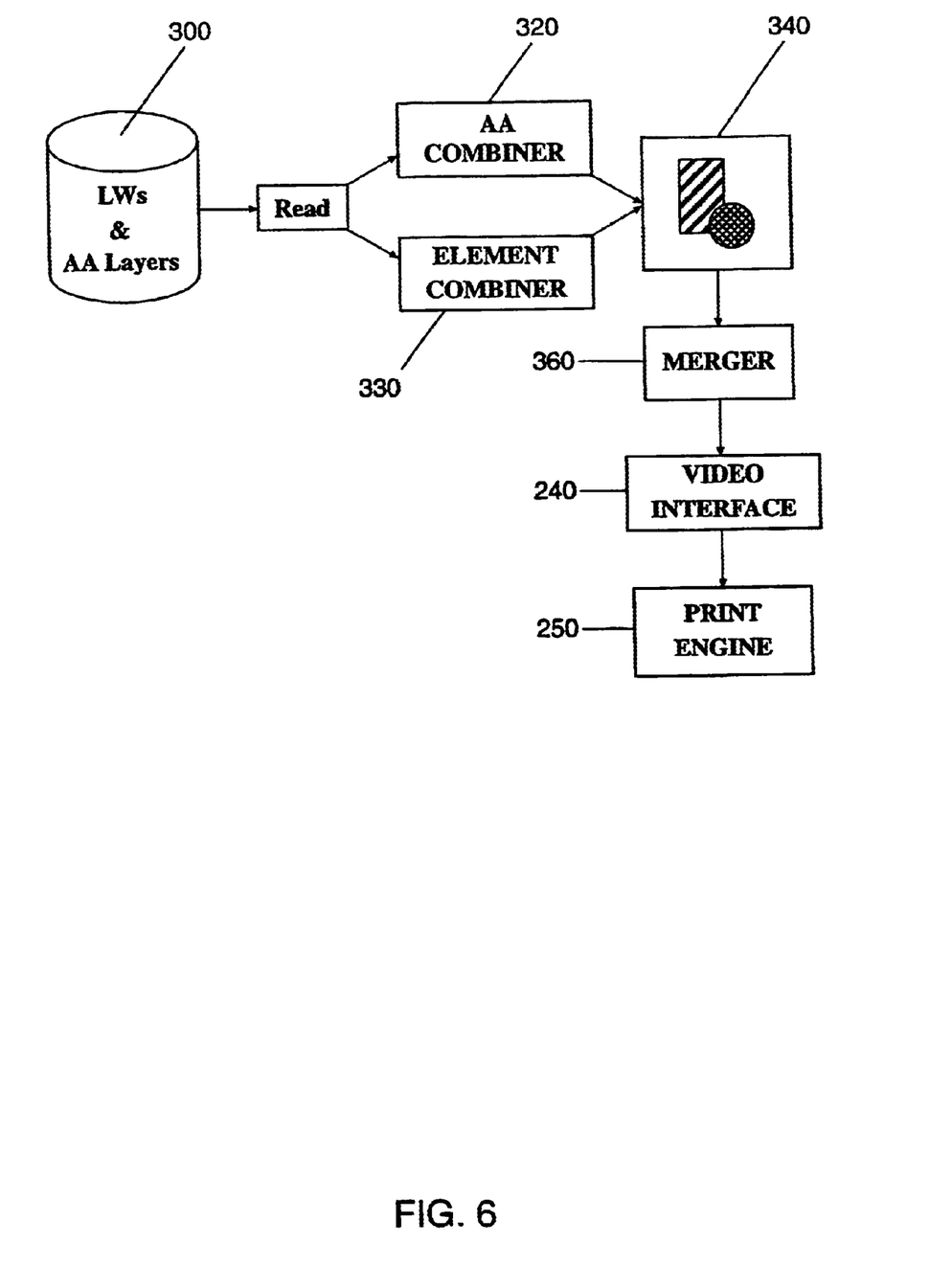
FIG. 6 is a schematic description of a system according to a first embodiment of the present invention.

FIG. 6 is a schematic description of the system of a first embodiment of the present invention, that merges the information in the AA layer with the elements' raster data in a pipeline, on the way to the video interface.

The system comprises rasterized elements' storage 300, two processors: the AA Combiner 320 and the Elements Combiner 330, operable to process the AA layer and the elements' rasters, respectively, into the frame buffer 340, and a Merger 360 operable to calculate the final value for each pixel and send it to the video interface 240, to be further sent to the print-engine 250.

The rasterized elements' storage 300 contains rasterized (possibly LW) elements, along with their individual AA layers, created in the manner described above. The element Combiner 330 reads the raster representation of the currently processed element. The AA Combiner 320 reads the AA layer of the same element. Frame buffer 340 holds for each pixel, three values:

* Background factor (B)
  B=0 (opaque)
  B=1 (background) or
  0<B<1=background portion (Semi-background).
* 'Color value' (C)
  =0, if B=0 or 1
  =color value of pixel in element, otherwise.
* 'Background color' (O)=color value of pixel in frame buffer.

For each variable element being rendered into the frame buffer, the following occurs:

The Element Combiner 330 copies each non-background pixel to the 'O' field of the corresponding pixel in frame buffer 340, and clears the corresponding 'B' and 'C' fields (possibly set by a previous element).

The AA Combiner 320 writes each of the AA layer's pixels to the 'B' and 'C' fields of the corresponding pixel in frame buffer 340, not disturbing the 'O' fields.

The processing of the AA layer by the AA Combiner 320 may be done sequentially, or in parallel to the processing of the element data by the Elements Combiner 330. However, the processing of a new element will not start before both layers of the previous element had been fully rendered.

When the last element of the page has been processed, frame buffer 340 contains, for each pixel:

In the 'O' field—the color value of the last opaque pixel rendered in that location;

In the 'B' field—0 if the last pixel written at that location is opaque, or Background factor if it was Semi-background;

In the 'C' field—0 if the last pixel written at that location is opaque, or the pixel color value if the last pixel written there was semi-background.

Frame buffers 340 is read into a pipeline that feeds the three fields for each pixel sequentially to the Merger 360, the output of which is the correct pixel value, as explained above.

Merger 360 may be implemented with a Fast ALU (Arithmetic Logic Unit) that uses three fields to calculate the final pixel color. The calculation may use the formula:

PixelColor='C' where 'B'=0;
PixelColor='O' where 'H'=1;
PixelColor=('O' * 'B')+('C' * (1–'B')) otherwise, or a similar formula according to the required implementation.

In a different implementation, the Merger may comprise a 3-dimensional LUT (Look Up Table), where memory is used to store the resulting pixel color values for all combinations of 'O', 'C' and 'B'. When merging, the three actual values are used as indexes to the 3-dimensional LUT, to retrieve the appropriate pixel color value.

Figure 7:
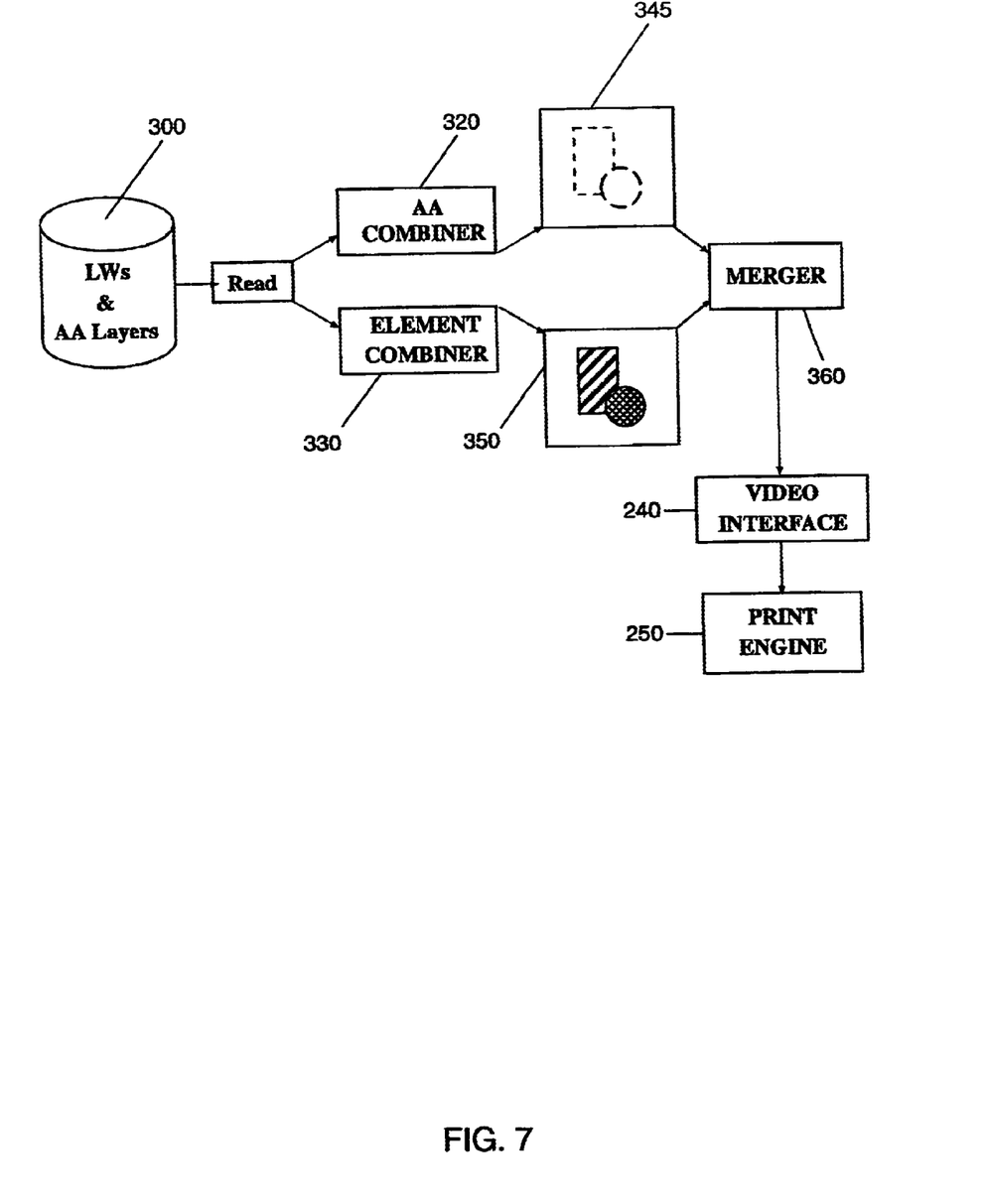
FIG. 7 is a schematic description of a system according to a second embodiment of the present invention.

An alternative hardware configuration could be applied, as shown in FIG. 7, using two separate frame buffers: the AA frame buffer 345 and the Elements frame buffer 350. In this configuration, the three fields attached to each pixel in the first configuration are divided between the two frame buffers. The AA frame buffer 345 holds the AA layer information namely, the 'B' and 'C' fields as defined above, and the Element frame buffer 350 holds the 'O' field.

The Element Combiner 330 copies each non-background pixel to the Element frame buffer 350 and clears the corresponding pixel of the AA frame buffer 345 (possibly set by a previous element).

The AA Combiner 320 writes each of the AA layer's pixels to the AA frame buffer 345, not disturbing the Element frame buffer 350.

Processing is done in parallel or sequentially and again, the processing of a new element will not start before both layers of the previous element had been fully rendered. When the last element has been processed, the AA frame buffer contains significant information only for those Semi-background pixels that were not covered by other elements.

Both frame buffers are read simultaneously into a pipeline that feeds the pixels sequentially to the Merger 360, the output of which is the correct pixel value, as explained above.

In using the two-buffer configuration, advantage can be taken of the fact that pixel with AA factor that is Semi Background are relatively scarce. Since only these pixels need to be described in the AA frame buffer, this data may be held in a more compact format, such as run-length encoding as described above.

This implementation, using either one or two frame buffers, is slightly less accurate than the method referred to as the "Accurate" method, where each anti-aliased element was merged into the frame buffer sequentially, using its AA layer. In the hardware implementation suggested, and illustrated in FIGS. 6 and 7, when AA layer pixels of different elements fall on the same location on the page, only the last one (of the upper most element) will be considered, instead of merging the values of all the elements underneath.

It will be clear to any person skilled in the art that the different frame buffers referred to throughout the above description may be replaced by other raster-containing forms of page pixel-maps, such as, but not limited to Scitex LW format.

It will be appreciated by persons skilled in the art that the present invention is not limited by what has been particularly shown and described herein above. Rather the scope of the invention is defined by the claims that follow.

I claim:

1. A method for building a raster representation of an anti-aliased page comprising a plurality of elements for digital printing, said method comprising the steps of:
   rasterizing each of said plurality of elements to a format comprising, for each pixel of said element;
   color value; and
   binary background attribute;
   anti-aliasing each of said plurality of rasterized elements, to produce pixels with background factors, said background factors having any of an Opaque value, a Background value and one of a plurality of Semi-Background values; and
   composing said page by placing said anti-aliased elements into a page pixel-map sequentially, where the value of each page pixel in said page pixel-map is calculated based on:
   said color value of the corresponding element's pixel,
   the background factor of said corresponding element's pixel, and
   the previous value of said page pixel.

2. The method of claim 1 wherein said background factors for all the element pixels are kept as a separate data structure.

3. The method of claim 1 wherein said step of composing is done for said entire page.

4. The method of claim 1 wherein said step of composing is done for portions of said page.

5. A method according to claim 1 wherein said page is monochromatic.

6. A method according to claim 1 wherein said page is polychromatic and wherein said method for building said raster representation is applied to each color component.

7. An apparatus for building a raster representation of an anti-aliased page comprising a plurality of elements for digital printing, said apparatus comprising:
   first storage means for storing rasterized page elements;
   second storage means for storing a background factor for each pixel of each of said elements, said background factor having any of an Opaque value, a Background value and one of a plurality of Semi-Background values;
   electronic means, coupled to said first and second storage means, for reading said rasterized page elements and said background factors into said first and second storage means;
   memory means comprising a frame buffer, coupled to said electronic means, for holding pixel value, background factor and page pixel value for each pixel of said page elements;
   processing means coupled to said frame buffer, said processing means operable to:
   clear said frame buffer;
   sequentially render each of said plurality of elements into said frame buffer, said rending comprising
      skipping the location in said frame buffer for each pixel of said element for which said background factor has the value Background;
      writing said background factor and said pixel value in said frame buffer, for each pixel of said element for which said background factor has one of said Semi-background values; and
      writing said page pixel value in said frame buffer, for each pixel of said element for which said background factor has the value Opaque, and clearing said background factor and said pixel value for said pixel;
   merging means coupled to said frame buffer, operable to receive pixel value, page pixel value and background factor for each pixel of said page from said frame buffer and merge them to a single pixel value; and
   output means coupled to said merging means, operable to deliver said merged pixel value from said merging means to any of a group including: a memory storage, a disk storage, and a digital printing engine.

8. The apparatus of claim 7 wherein said memory means comprises:
   a first frame buffer, coupled to said electronic means, for holding page pixel values;
   a second frame buffer, coupled to said electronic means, for holding background factors and pixel values of pixels;
   and wherein said processing means is coupled to said first frame buffer and to said second frame buffer, and is operable to:

clear said first frame buffer and said second frame buffer;
sequentially render each of said plurality of elements into said first frame buffer and said second frame buffer, said rending comprising:
skipping pixel values for which said background factor has the value Background;
writing both pixel value and background factor into said second frame buffer when the background factor of said pixel has one of said Semi-background values; and
writing pixel value into said first frame buffer and clearing said pixel location in said second frame buffer when the background factor of said pixel has the value Opaque;

and wherein said merging means are coupled to said first frame buffer and to said second frame buffer, operable to receive pixel value, page pixel value and background factor for each pixel, from said first and second frame buffers, and merge them to a single pixel value.

9. The apparatus of claim 7 wherein said merging means comprises a look-up table.

10. The apparatus of claim 8 wherein said merging means comprises a look-up table.

11. The apparatus of claim 7 wherein said frame buffer holds pixel values for said entire page.

12. The apparatus of claim 8 wherein said first and second frame buffers hold pixel values for said entire page.

13. The apparatus of claim 7 wherein said frame buffer holds pixel values for a portion of said page.

14. The apparatus of claim 8 wherein said first and second frame buffers hold pixel values for a portion of said page.

15. The apparatus according to claim 8, wherein said second frame buffer holds background factors only for pixels for which said background factor has one of a plurality of Semi-Background values.

* * * * *